(12) United States Patent
Jacobs et al.

(10) Patent No.: US 8,707,826 B2
(45) Date of Patent: Apr. 29, 2014

(54) AXLE WITH VARIABLE VOLUME SUMP

(75) Inventors: Lourens M. Jacobs, Cedar Falls, IA (US); Gerald R. Thom, Livonia, MI (US); Joseph P. Elser, Milford, MI (US); Muhammad Hamid Iqbal, Canton, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 539 days.

(21) Appl. No.: 12/652,058

(22) Filed: Jan. 5, 2010

(65) Prior Publication Data

US 2011/0162482 A1 Jul. 7, 2011

(51) Int. Cl.
*F16H 57/04* (2010.01)

(52) U.S. Cl.
USPC .......................... 74/607; 74/606 R; 74/606 A

(58) Field of Classification Search
USPC ...... 74/606 R, 607, 606 A; 137/79, 389, 486, 137/855, 856; 236/101 R, 101 E; 475/90, 93, 475/160; 184/6.12, 6.22
See application file for complete search history.

(56) References Cited

U.S. PATENT DOCUMENTS

| | | | |
|---|---|---|---|
| 3,729,132 A * | 4/1973 | Ludwig | 236/101 R |
| 4,217,926 A | 8/1980 | Van Gorder | |
| 4,630,711 A | 12/1986 | Levrai et al. | |
| 5,185,505 A * | 2/1993 | Grzywana | 219/689 |
| 5,259,194 A | 11/1993 | Okada | |
| 5,310,388 A * | 5/1994 | Okcuoglu et al. | 475/88 |
| 5,540,300 A | 7/1996 | Downs et al. | |
| 5,595,214 A * | 1/1997 | Shaffer et al. | 137/517 |
| 5,718,651 A * | 2/1998 | Merkle et al. | 475/159 |
| 5,768,954 A | 6/1998 | Grabherr et al. | |
| 6,155,135 A | 12/2000 | Gage et al. | |
| 6,299,561 B1 | 10/2001 | Kramer et al. | |
| 6,595,887 B2 | 7/2003 | Thoma | |
| 7,178,426 B2 | 2/2007 | Turner et al. | |
| 7,189,178 B2 * | 3/2007 | Weith | 475/160 |
| 7,213,682 B2 | 5/2007 | Gibson et al. | |
| 2003/0188546 A1 * | 10/2003 | Schneider et al. | 62/304 |
| 2010/0038174 A1 * | 2/2010 | Mordukhovich et al. | 184/6.12 |

FOREIGN PATENT DOCUMENTS

JP    58091963 A  *  6/1983   ............. F16H 57/04

* cited by examiner

*Primary Examiner* — Thomas Diaz
(74) *Attorney, Agent, or Firm* — Ralph E Smith

(57) ABSTRACT

An axle having a variable volume sump. The axle includes an axle housing that defines a gear chamber and a separate reservoir. The gear chamber and the reservoir are in fluid communication with each other via an opening. A regulator is located adjacent the opening. The regulator is operable to assume a first closed position that obstructs the opening when a temperature in the axle is below a predetermined value, and is also operable to assume a second open position that places the gear chamber and the reservoir in fluid communication via the opening when the temperature is above the predetermined value.

18 Claims, 5 Drawing Sheets

AXLE WITH VARIABLE VOLUME SUMP

FIELD OF THE INVENTION

The technology herein relates generally to an axle for a vehicle, more particularly, to an axle that has a variable volume sump for holding the axle lubricant.

BACKGROUND OF THE INVENTION

Fuel economy is an ever increasing consideration for vehicle owners, because fuel is one of the leading operating costs in owning a vehicle. In typical axle configurations, fuel economy savings are realized by altering the gear ratios. In such typical axle configurations, the axles are designed to have a single lubricant reservoir. The amount of lubricant required for any given axle is then set based upon the thermal limitations of the axle components. The maximum temperature goal is set by a worst case duty cycle of the axle, which generally requires a high volume of lubricant to achieve the thermal goals of the axle. This high volume of lubricant, however, is not needed during normal operation of the axle. This single reservoir design, in which the maximum amount of lubricant is stored in a single reservoir, is a major cause of parasitic losses, i.e., pumping losses. For example, the axle becomes less efficient due to these extra pumping losses when the axle is operating well below the maximum temperature goal in highway, cold start and short trip operating situations.

Accordingly, there is a need to increase the efficiency of vehicle axles when operating at a lower than optimal temperature.

BRIEF SUMMARY OF THE INVENTION

In accordance with a first aspect of an embodiment of the invention, an axle for a motor vehicle is provided. The axle includes an axle housing that defines a gear chamber and a separate reservoir. The gear chamber and the reservoir are in fluid communication with each other via an opening. A regulator is located adjacent the opening. The regulator is operable to assume a first closed position that obstructs the opening when a temperature in the axle is below a predetermined value, and is also operable to assume a second open position that places the gear chamber and the reservoir in fluid communication via the opening when the temperature is above the predetermined value.

In accordance with another aspect of an embodiment of the invention, the reservoir has an open top in fluid communication with the gear chamber and the at least one opening is in a lower portion of the reservoir below the open top. The reservoir is preferably dimensioned to accommodate approximately 70% of a total amount of lubricant for the axle, and positioned within the axle housing such that gears within the gear chamber operate to direct the lubricant into the reservoir through the open top when the gears are in motion.

In accordance with a further aspect of an embodiment of the invention, the regulator is a bi-metal valve formed from at least two different layers of materials. Preferably, these at least two different layers of materials are selected from the group consisting of alloys of Ni, Cu, Ag, Cr, C, Al, Mn, Mo, Si, Co, Zn and Fe.

BRIEF DESCRIPTION OF THE DRAWINGS

The figures are for illustration purposes only and are not necessarily drawn to scale. The invention itself, however, may best be understood by reference to the detailed description which follows when taken in conjunction with the accompanying drawings, in which like reference numbers denote like components, and in which.

DETAILED DESCRIPTION OF THE INVENTION

Figure 1:
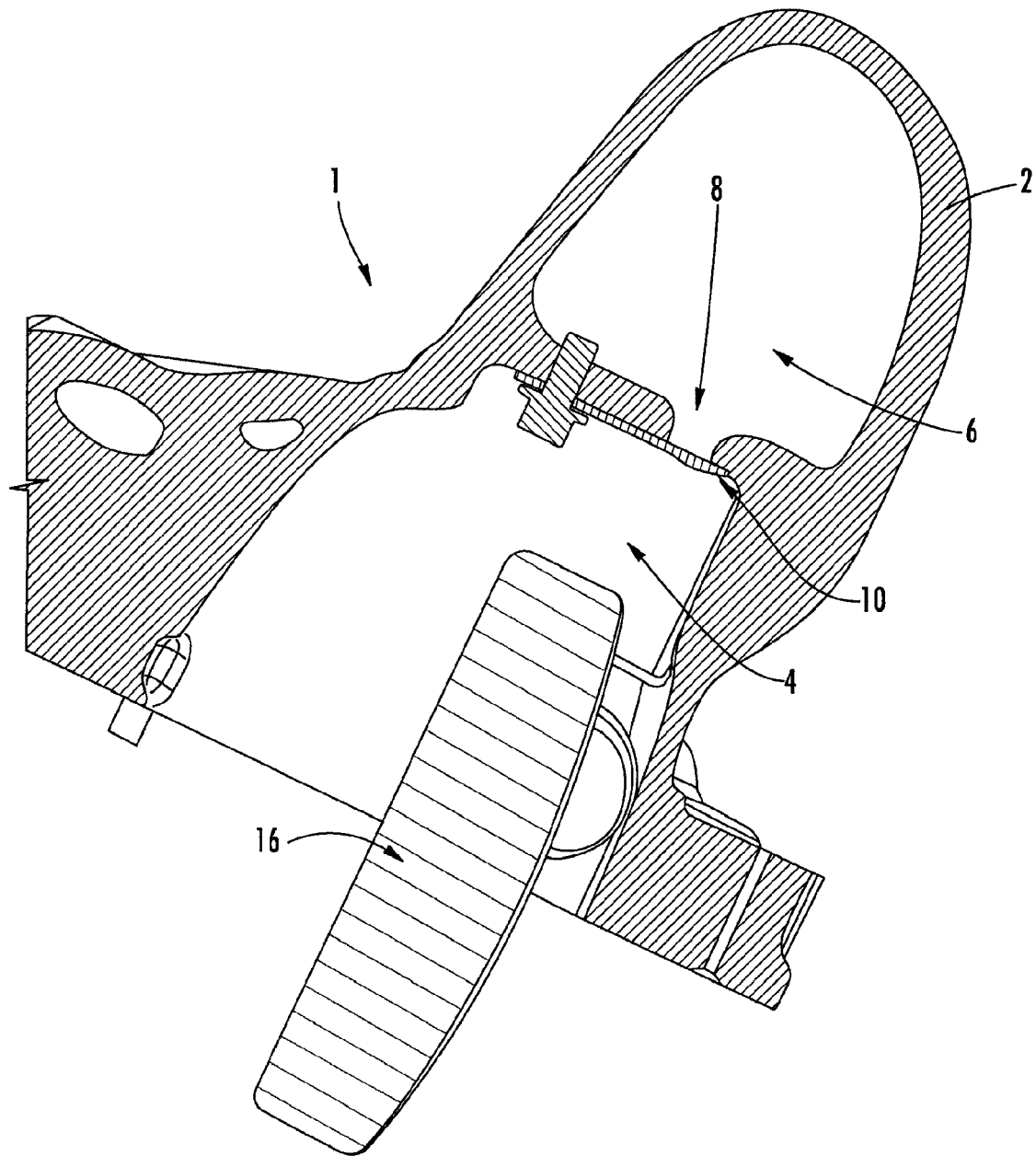
FIG. 1 is a cross-section view of the axle according to an embodiment of the invention with the regulator in a closed position.
Figure 2:
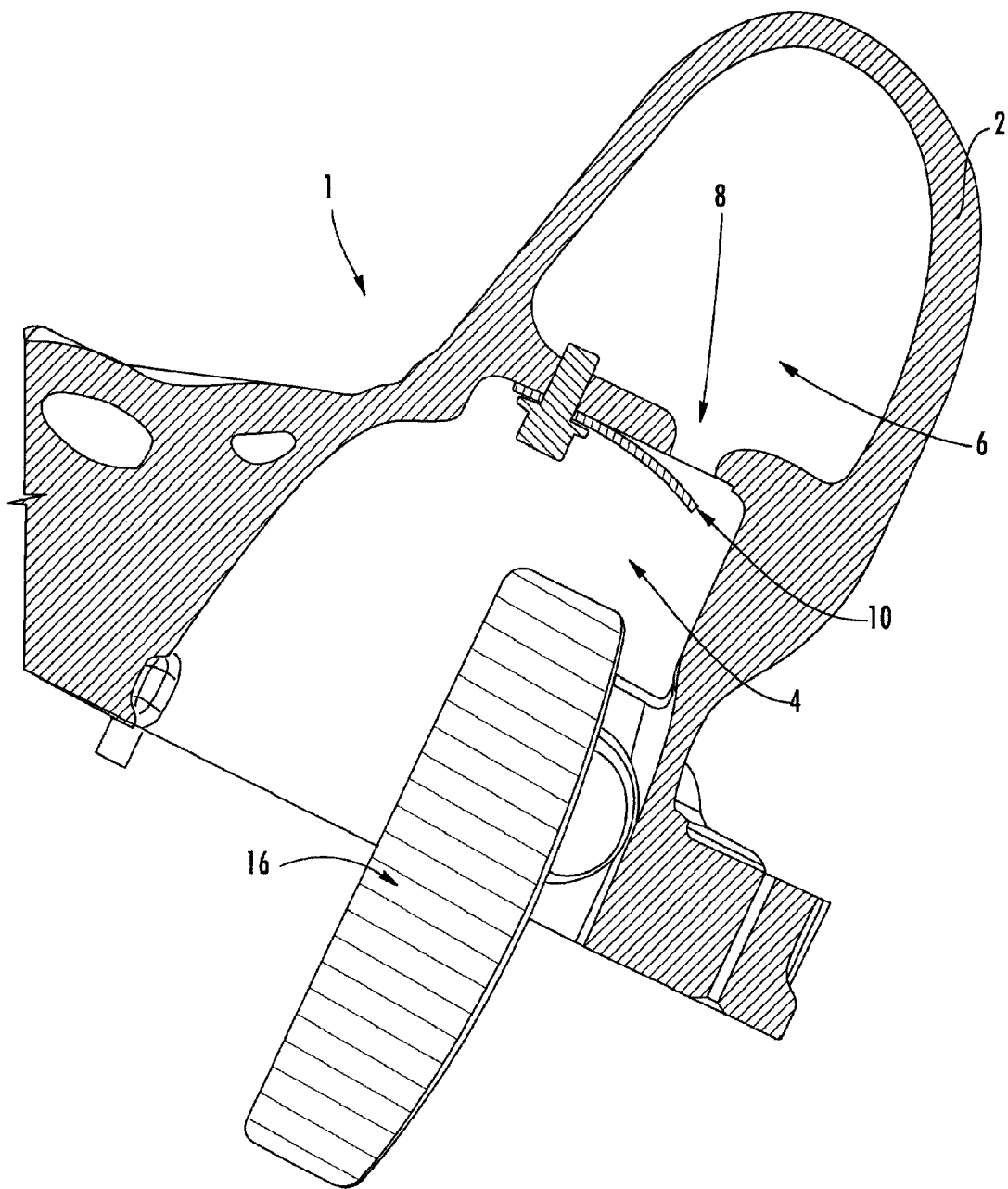
FIG. 2 is cross-section view of the axle according to an embodiment of the invention with the regulator in an open position.

The following description of the preferred embodiment(s) is merely exemplary in nature and is in no way intended to limit the claimed invention, its application, or uses.

Referring now to the drawings, FIGS. 1-4 illustrate an embodiment of the axle 1 according to the invention. The axle 1 includes an axle housing 2 defining a gear chamber 4 and a reservoir 6. The gear chamber 4 and the reservoir 6 are in fluid communication with each other via at least one opening 8 in a lower portion of the reservoir 6. As shown in greater detail in FIG. 4, the reservoir 6 also has an open top 12 in fluid communication with the gear chamber 4. Preferably, the reservoir 6 is dimensioned to accommodate approximately 70% of a total amount of lubricant for the axle. The flow of the axle lubricant will be described in greater detail below.

A regulator 10 is located adjacent the at least one opening 8 in the lower portion of the reservoir 6. As described in further detail below, the regulator 10 is moveable between a first closed position (FIG. 1) wherein the regulator 10 obstructs the at least one opening 8, and a second open position (FIG. 2) where the opening 8 is uncovered and the gear chamber 4 and the reservoir 6 are in fluid communication with each other via the at least one opening 8.

In the embodiment shown in FIGS. 1-4, the regulator 10 is a bi-metal valve that includes at least at least two different layers of materials bonded together. Preferably, the at least two different layers of materials are selected from the group consisting of alloys of Ni, Cu, Ag, Cr, C, Al, Mn, Mo, Si, Co, Zn and Fe. In the preferred embodiment, the bi-metal valve is a two layer structure, wherein the first layer is an Invar alloy composed of approximately 64% Fe and 36% Ni and the second layer is Fe. As one of skill in the art will recognize from the instant disclosure, other material combinations can be used as the bi-metal valve in the invention, and the selection of the particular number of layers and materials for those layers will be dependent on factors such as the degree of deflection needed, compatibility of the materials with the axle lubricant, the durability of the materials under extended use conditions, the temperature range to be encountered under axle operating conditions, the desired opening temperature of the bi-metal valve in a particular axle application, and the resonant frequency of the bi-metal valve relative to the operating environment of the axle.

The capacity of the reservoir 6 relative to the percentage of axle lubricant is preferably tuned to optimize the efficiency/load capability in the axle. For example, the capacity ratio of the gear chamber 4/reservoir 6 can be 10%/90%; 20%/80%; 30%/70%; or 50%/50%. The particular ratio selected will be dependent on the specific design of the axle and the gearing and other components employed therein.

Figure 3:
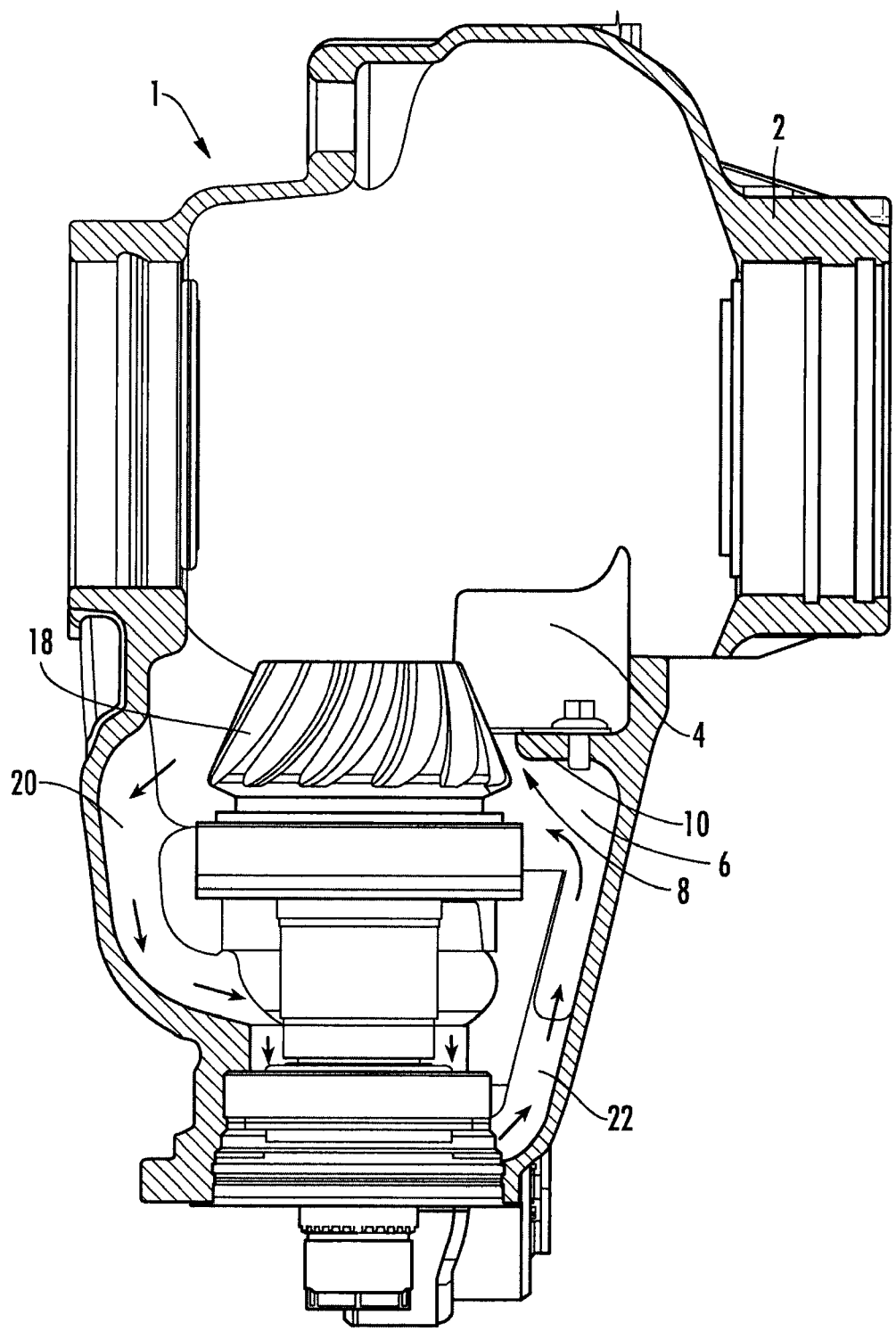
FIG. 3 is a partial cross-sectional view illustrating the lubrication flow path in the axle of FIG. 1.
Figure 4:
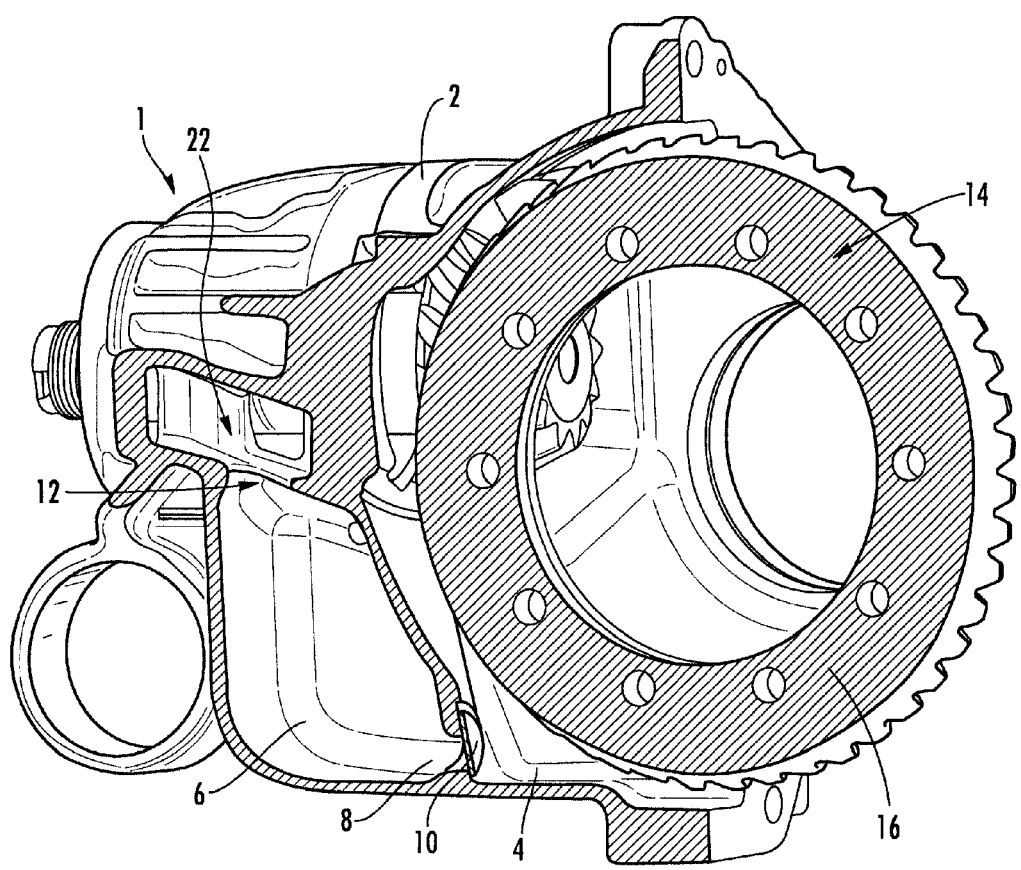
FIG. 4 is a vertical cross-section view of the axle of FIG. 1.

Operation of the axle according to the illustrated embodiment will now be described with respect to FIGS. 3 and 4. For example, in a cold start situation, 30% of the apportioned lubricant for the axle 1 is retained in the gear chamber 4 and 70% of the lubricant is contained in the reservoir 6. When the gearing 14 within the gear chamber 4 starts moving, the gearing operates as a pump and splashes the lubricant over the gearing 14 and the gear chamber 4. Specifically, in the embodiment shown in FIGS. 3 and 4, the ring gear 16 will pump the lubricant in the bottom part of the gear chamber 4 towards the bearings of the pinion 18 via a supply passage 20 in the gear chamber 4 (see arrows in FIG. 3 showing flow path of lubricant). The lubricant will then lubricate the bearings of the pinion 18 and return to the gear chamber 4 via a return passage 22. As long as the lubricant temperature remains below a predetermined value, the lubricant will follow this path to lubricate the gearing 14.

Once, however, the temperature in the gear chamber 4 rises above the predetermined value, the regulator 10 starts to open gradually. This, in turn, causes the additional lubricant stored in the reservoir 6 to enter the gear chamber 4 and cooperate with the lubricant already in the gear chamber 4 to cool and further lubricate the gearing 14 an bearings of the pinion 18. As long as the temperature keeps rising, the regulator 10 will eventually open so that 100% of the lubricant in the axle is circulated through the gear chamber 4. The temperature at which the regulator 10 starts to open is dependent on the axle lubricant and the axle construction, as different axle constructions typically require different lubrication levels for optimum performance. For example, with the invention described herein, the temperature at which the regulator 10 starts to open is preferably in the range of 200° F. to 250° F.

When the temperature in the axle starts to lower, the regulator 10 starts to gradually close. Once fully closed, the reservoir 6 is ready to be refilled. This is accomplished by the pumping action of the gearing 14. Specifically, as the gearing 14 continues to pump the lubricant in the gear chamber 4, the lubricant is directed into the open top of the reservoir 6 via the return passage 22. Since the regulator 10 has closed the opening between the reservoir 6 and the gear chamber 4, the reservoir 6 fills until 70% of the lubricant is contained therein. Thereafter, the process can start over when the temperature exceeds the predetermined value.

Figure 5:
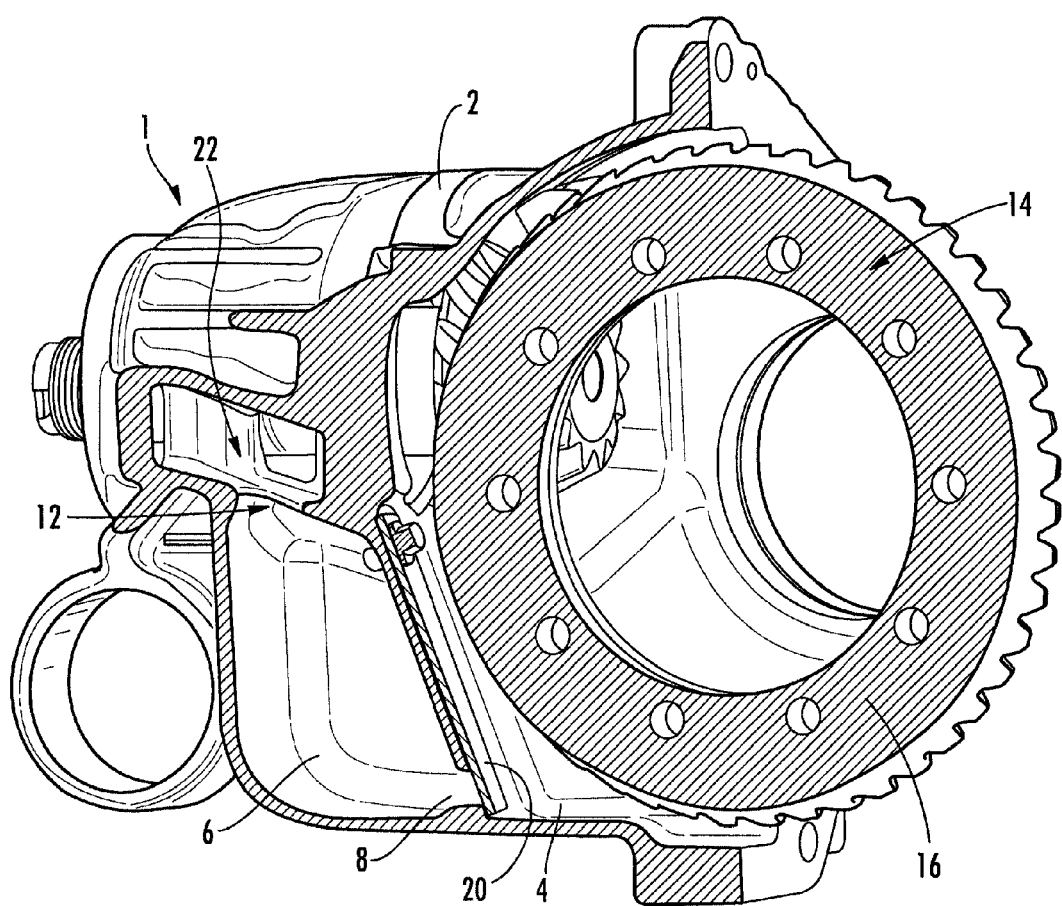
FIG. 5 is a vertical cross-section view illustrating of the axle according to a further embodiment of the invention.

FIG. 5 illustrates a further embodiment of the invention. In FIG. 5, like reference numerals are used to denote like components to those shown in FIGS. 1-4, and the description thereof is omitted.

In the embodiment shown in FIG. 5, the regulator 20 is a bi-metal valve that is oriented in the vertical direction relative to a central axis of the axle about which the pinion gear 14 rotates, as opposed to a horizontal direction shown in FIGS. 1-4. With such a configuration, the overall length of the regulator 20 can be increased. Increasing the overall length of the regulator 20 enables the regulator 20 to separate from the opening 8 for a greater distance compared to the embodiment shown in FIGS. 1-4. In addition, orienting the regulator 20 in the vertical direction provides for a greater clearance between the regulator 20 and the ring gear 16 when the regulator 20 opens.

Because the axle described herein operates with less lubrication in the gear chamber during lower temperature situations, greater efficiency can be realized due to a reduction in pumping losses. This helps increase the fuel economy of the axle.

Of course, one skilled in the art may readily conceive of various modifications to the above described invention. For example, a temperature sensor along with a servo-controlled solenoid that is opened and close upon the sensing of a predetermined temperature can be used for the regulator. In addition, a bi-metallic plug can be used which is fitted within the opening between the gear cavity and the reservoir, the bi-metallic plug changing an orifice dimension in response to temperature changes.

Although the invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims. Therefore, the invention should not be limited by the specific disclosure herein, but only by the appended claims.

What is claimed is:

1. An axle comprising:
an axle housing defining a gear chamber and a reservoir, the gear chamber and the reservoir being in fluid communication with each other via at least one opening; and
a regulator adjacent the at least one opening, the regulator configured to assume a closed position that obstructs the at least one opening when a temperature is below a predetermined value, and configured to assume an open position that places the gear chamber and the reservoir in fluid communication via the at least one opening when the temperature is above the predetermined value such that the gear chamber contains less lubrication when the temperature is below the predetermined value as compared to when the temperature is above the predetermined value.

2. The axle according to claim 1, wherein the regulator is a bi-metal valve.

3. The axle according to claim 2, wherein the bi-metal valve is oriented in a horizontal direction relative to a central axis of the axle.

4. The axle according to claim 2, wherein the bi-metal valve is oriented in a vertical direction relative to a central axis of the axle.

5. The axle according to claim 2, wherein the bi-metal valve comprises at least two different layers of materials.

6. The axle according to claim 5, wherein the at least two different layers of materials are selected from the group consisting of alloys of Ni, Cu, Ag, Cr, C, Al, Mn, Mo, Si, Co, Zn and Fe.

7. The axle according to claim 1, wherein the reservoir has an open top in fluid communication with the gear chamber and the at least one opening is in a lower portion of the reservoir below the open top.

8. The axle according to claim 7, wherein the reservoir is positioned within the axle such that gears within the gear chamber operate to direct lubricant into the reservoir through the open top when the gears are in motion.

9. The axle according to claim 1, wherein the reservoir is dimensioned to accommodate between approximately 50% to 90% of a total amount of lubricant for the axle.

10. The axle according to claim 1, wherein an amount of movement of the regulator between the closed position and the open position is dependent on a degree to which the temperature has risen above the predetermined threshold.

11. An axle comprising:
an axle housing defining a gear chamber and a reservoir, the reservoir having an open top and at least one opening is in a lower portion of the reservoir below the open top, the gear chamber and the reservoir being in fluid communication with each other via the at least one opening and the open top; and a bi-metal valve adjacent the at least one opening, the bi-metal valve configured to assume a closed position that obstructs the at least one opening when a temperature is below a predetermined value, and configured to assume an open position that places the gear chamber and the reservoir in fluid communication via the at least one opening when the temperature is above the predetermined value such that the gear chamber contains less lubrication when the temperature is below the predetermined value as compared to when the temperature is above the predetermined value.

12. The axle according to claim 11, wherein the bi-metal valve is oriented in a horizontal direction relative to a central axis of the axle.

13. The axle according to claim 11, wherein the bi-metal valve is oriented in a vertical direction relative to a central axis of the axle.

14. The axle according to claim 11, wherein the bi-metal valve comprises at least two different layers of materials.

15. The axle according to claim 14, wherein the at least two different layers of materials are selected from the group consisting of alloys of Ni, Cu, Ag, Cr, C, Al, Mn, Mo, Si, Co, Zn and Fe.

16. The axle according to claim 11, wherein the reservoir is positioned within the axle such that gears within the gear chamber operate to direct lubricant into the reservoir through the open top when the gears are in motion.

17. The axle according to claim 11, wherein the reservoir is dimensioned to accommodate between approximately 50% to 90% of a total amount of lubricant for the axle.

18. The axle according to claim 11, wherein an amount of movement of the bi-metal valve between the closed position and the open position is dependent on a degree to which the temperature has risen above the predetermined threshold.

* * * * *